United States Patent [19]

Ogiya et al.

[11] Patent Number: 5,198,186

[45] Date of Patent: Mar. 30, 1993

[54] FUEL ASSEMBLY FOR NUCLEAR REACTOR

[75] Inventors: Shunsuke Ogiya; Toru Yamamoto, both of Yokohama; Katsumasa Haikawa; Akira Nishimura, both of Hitachi, all of Japan

[73] Assignee: Kabushiki Kaisha Toshiba, Japan

[21] Appl. No.: 521,709

[22] Filed: May 10, 1990

[30] Foreign Application Priority Data

May 10, 1989 [JP] Japan .................................. 1-116771

[51] Int. Cl.$^5$ .............................................. G21C 3/32
[52] U.S. Cl. .................................. 376/435; 376/428; 376/419; 376/434
[58] Field of Search ............... 376/444, 419, 428, 435, 376/434

[56] References Cited

U.S. PATENT DOCUMENTS

| H722 | 1/1990 | Sofer et al. | 376/428 |
|---|---|---|---|
| 3,799,839 | 3/1974 | Fischer et al. | 376/419 |
| 4,280,874 | 7/1981 | Kawai et al. | 376/419 |
| 4,285,769 | 8/1981 | Specker et al. | 376/267 |
| 4,587,090 | 5/1986 | Mochida et al. | 376/428 |
| 4,629,599 | 12/1986 | Crowther et al. | 376/212 |
| 4,683,113 | 7/1987 | Mochida et al. | 376/419 |
| 4,968,479 | 11/1990 | Ogiya et al. | 376/428 |

FOREIGN PATENT DOCUMENTS 3828616  5/1989  Fed. Rep. of Germany ...... 376/428

Primary Examiner—Donald P. Walsh
Assistant Examiner—Meena Chelliah

[57] ABSTRACT

A fuel assembly of the type having a plurality of a fuel material characterized in that a water rod disposed in a channel has a large diameter so that it has a space into which a plurality of fuel rods could be loaded and liquid water boil flows through the water rod and which has a section filled with a fuel material comprising a natural uranium section defined at least one of the upper and lower ends of each fuel rod and an enriched uranium section comprising the uppermost, intermediate and lowermost sections each having a different degree of average enrichment across a cross section of the fuel assembly and the upper and lowermost sections have the degree of enrichment across a section of the fuel assembly is lower than that of the intermediate section, and the enriched uranium section has two sections each of which has a different content of a burnable poison per unit length in the axial direction and the content of the burnable poison per unit of length in the axial direction in the uppermost section is less than that in one or more sections outside of the enriched uranium section.

11 Claims, 15 Drawing Sheets (i)

(UPPER END)

| NATURAL URANIUM |
| LOW ENRICHMENT |
| HIGH ENRICHMENT |
| LOW ENRICHMENT |
| NATURAL URANIUM |

(LOWER END)

(DISTRIBUTION OF AVERAGE ENRICHMENT ACROSS A CROSS SECTION OF A FUEL ASSEMBLY)

(ii)

| NONE |
| LOW AMOUNT OF BURNABLE POISON |
| MIDDLE AMOUNT OF BURNABLE POISON |
| HIGH AMOUNT OF BURNABLE POISON |
| NONE |

(DISTRIBUTION OF AN INFLAMMABLE POISON IN FUEL ROD CONTAINING AN INFLAMMABLE POISON)

(DISTRIBUTION OF AVERAGE ENRICHMENT ACROSS A CROSS SECTION OF A FUEL ASSEMBLY)

(DISTRIBUTION OF AN INFLAMMABLE POISON IN FUEL ROD CONTAINING AN INFLAMMABLE POISON)

(i) (UPPER END)

| NATURAL URANIUM |
| LOW ENRICHMENT |
| HIGH ENRICHMENT |
| LOW ENRICHMENT |
| NATURAL URANIUM |

(LOWER END)

(DISTRIBUTION OF AVERAGE ENRICHMENT ACROSS A CROSS SECTION OF A FUEL ASSEMBLY)

(ii)

| NONE |
| LOW AMOUNT OF BURNABLE POISON |
| MIDDLE AMOUNT OF BURNABLE POISON |
| HIGH AMOUNT OF BURNABLE POISON |
| NONE |

(DISTRIBUTION OF AN INFLAMMABLE POISON IN FUEL ROD CONTAINING AN INFLAMMABLE POISON)

(iii)

| NONE |
| LOW ENRICHMENT |
| NONE |

(DISTRIBUTION OF AN INFLAMMABLE POISON IN FUEL ROD CONTAINING AN INFLAMMABLE POISON)

FIG. 13(c)

FUEL ASSEMBLY FOR NUCLEAR REACTOR

BACKGROUND OF THE INVENTION

The present invention relates to a fuel assembly for a boiling water reactor which is referred to as a reactor hereinafter in this specification unless otherwise stated, and a core of a reactor loaded with the above mentioned fuel assemblies.

One of the objects of the present invention is to provide an economically improved fuel assembly with a high degree of burnup and a core of the reactor. In order to attain the economical improvement of a nuclear power plant, it is effective to improve the coefficient of utilization of the plant by increasing the operation period while reducing the fuel cycle cost by remarkably increasing the degree of burnup of the fuel.

In order to increase the degree of burnup, various methods for enrichment have been devised and demonstrated, but the neutron spectrum is hardened to result in the following phenomena:

(1) the increase of the absolute value of the void coefficient;
(2) the increase of the degree of reaction in the core when the temperature is low; and
(3) the decrease of the control capability of burnable poisons such as gadolinium.

It follows therefore that there are fears that not only the thermal margin but also the shut-down margin are decreased.

In the case of attaining a high degree of fuel burnup by only increasing the enrichment, the cost of natural uranium for production of the fuel and the like are increased so that the degree of reduction of the costs of uranium enrichment and so on is increased. As a result, the range of the decrease in cost of the fuel cycle is increased by increasing the degree of burnup.

In view of the above, the present invention provides a fuel with a highly economical specific burnup which can substantially solve the problems associated with the performance of the core and can attain a high degree of burnup by decreasing the enrichment to as low as possible.

SUMMARY OF THE INVENTION

In order to obtain a highly economical fuel, the present invention employs:
(1) the positive utilization of the output peaking,
(2) the reduction of the remaining quantity of gadolinium and
(3) the improvement of the ratio between water and uranium.

In this case, the utilization of output peaking is based on the underlying principle of the present invention that, from the standpoint of the nuclear flux distribution in the core or the fuel assembly, the quantity of U-235 in the high neutron flux region is increased while U-235 in the low neutron flux region is decreased in quantity, thereby increasing the coefficient of utilization of thermal neutrons so that the output peaking is increased while the degree of reaction at the core is improved.

The reduction of the remaining gadolinium means that, since the burnup of gadolinium is slow at the low end of the core and especially so at the upper portion of the core where the neutron spectrum is hard and the void coefficient is high, in these regions the concentration of gadolinium is made low beforehand so that the gadolinium which remains unburned is decreased to as practical a level as possible.

The improvement of the ratio between water and uranium means that by increasing the ratio between water and uranium, the coefficient of utilization of thermal neutrons and consequently the degree of reaction can be increased. By utilizing these means, a high degree of burnup can be attained with a minimum increase in the degree of concentration.

Now the features of the present invention will be described in detail hereinafter.

1. The Fuel Assembly

The fuel assembly in accordance with the present invention is assembled in accordance with the following designs.

(1) Utilization of Large-diameter Water Rods

In the case of the fuel assembly, the water rod exists at the center portion of the fuel assembly occupying a large area equal to the area of a plural number of fuel rods, for example four fuel rods, and the non-boiling water flows through the water rods. A sectional view of the conventional water rod is illustrated in FIG. 18 and the sectional area of a water rod in accordance with the present invention is about three time as large as that of the conventional water rod.

Due to the shape of the fuel assembly in accordance with the present invention, the water-fuel ratio is increased to larger than that of a conventional fuel assembly so that the neutron spectrum is softened, whereby the following advantages can be attained:

① the absolute value of the void coefficient is increased,
② the degree of the reaction at the core at low temperatures is increased and
③ the effect of the decrease in reaction control capability of burnable poisons such as gadolinium or the like is cancelled so that the degradation of the thermal margin and the shut-down margin can be prevented.

Simultaneously, since the ratio between water and the fuel is increased to larger than that of a conventional fuel assembly, the degree of reaction of the fuel can be improved.

(2) Distribution of Concentration In The Axial Direction

The neutron flux is lower at the upper and lower ends of the core than the center portion thereof. Therefore the natural uranium is disposed at the upper and lower ends of the fuel assembly so that the concentration of the fuel at the center portion of the assembly can be improved. As a result, the quantity of neutrons which leak in the vertical direction of the core can be decreased and the coefficient of utilization of the thermal neutrons can be increased. As a result, the degree of reaction at the core can be improved.

The relationship between the length of the natural uranium loaded at the upper and lower ends and the fuel economy is illustrated in FIG. 15. According to the present invention, by the combination of the peaking in the radial direction and the local peaking, the peaking in the axial direction satisfies the operation limit for the linear heat rating and the coefficient of economical utilization is likely to be saturated when the ratio (1/1) is changed to (2/1) so that each node at the upper and lower ends consists of natural uranium.

In the case of the fuel assembly in accordance with the present invention, the enrichment portion except the natural uranium portion consists of the lower, intermediate and higher sections depending upon the degree of sectional average enrichment and the degree to which the sectional average enrichment in the intermediate section is made higher than the other sections.

When the sectional average enrichment in the intermediate section is increased to more than that in the lower section, the output distribution of the fuel in the axial direction can be flattened, the increase in peaking due to the increase of the mismatching of the outputs of the fuel assemblies and the output peaking margin obtained are utilized for the peaking for improving other economical factors. For instance, the flattening of the distribution of the output in the axial direction is disclosed in Japanese Patent Publication No. 58-29878.

The low enrichment upper section is provided to improve the shut-down margin of the reactor. That is, when the lower temperature reduces the reactor shut-down margin to a minimum, the neutron flux increases at the upper section in the axial direction, but when the degree of enrichment is decreased in this section, the degree of reaction at the core is decreased so that the degree of reaction at the core can be decreased and consequently improve the reactor shut-down margin.

(3) Distribution of The Degree of Enrichment In The Radial Direction

The distribution of neutrons in the fuel assembly has the tendency to increase in the section facing the channel due to the existence of water outside of the channel. In the case of the fuel assembly in accordance with the present invention, the degree of utilization of neutrons is increased by increasing the degree of enrichment of the fuel rods facing the channel, thereby increasing the coefficient of utilization of neutron and consequently the degree of reaction of the fuel assembly.

(4) Distribution of Inflammable Poisons In The Axial Direction

In case of the boiling water reactor, in general, in order to adjust the degree of reaction at the core, burnable poison is mixed into the fuel rods.

According to the present invention, the distribution of burnable poisons contained in the fuel rods consists of four or five sections in the axial direction of the fuel assembly. That is, as described in (2) above, the distribution in the axial direction of the degree of enrichment, the upper and lower ends of the fuel rod are loaded with natural uranium, but do not contain burnable poisons. The other sections except these sections are defined as the upper, intermediate and lower sections and these sections contain a lower degree of enrichment, an intermediate degree of enrichment and a high degree of enrichment, respectively. The leakage of neutrons occurs at the upper and lower natural uranium sections. As a result, in the case of the fuel assembly in accordance with the present invention in which no burnable poison is contained in these sections, the output is low. In the fuel assembly in accordance with the present invention in which no burnable poison is contained in the upper and lower ends of the fuel rod, it becomes possible to minimize the reaction loss due to unburned burnable poisons.

Furthermore, the void efficiency is high and the neutron spectrum is hard at the upper portion of the core so that the burnup of gadolinium is slow, but according to the present invention, the concentration of burnable poisons is made low in this portion so that the reaction loss due to unburned burnable poisons at the upper end can be decreased. The relationship between the length of the section which contains a low degree of concentration of the burnable poison and the economical improvement is illustrated in FIG. 16. When the length of the section having a low concentration is increased the economical improvement is attained, but the economical improvement is gradually saturated and when the node is in excess of 3, the increase in economical improvement is less. In view of the above, according to the present invention, the 3 to 5 nodes have a low concentrations. As described, the concentration of the burnable poison is made higher in the lower section than in the intermediate section so that the distribution of output in the axial direction is flattened. Therefore, the increase of the output peaking due to the increase in the output mismatching between the fuel assemblies due to the high degree of burnup can be decreased and moreover the output peaking margin thus obtained is utilized for the improvement of other economical factors. As disclosed in Japanese Patent Publication No. 58-23913, in order to flatten the output distribution in the axial direction due to the distribution of the burnable poison, distribution is employed in which the quantity of the burnable poison in the lower section of the assembly is made higher than in the higher section.

As described above, the distribution of the burnable poison in the fuel rod in the axial direction is extended in five sections.

Furthermore, in some cases, the concentration of the burnable poison in the intermediate section is made equal to that in the lower section. As a result, at a temperature at which the reactor shut-down margin becomes minimum, the shut-down margin can be improved by decreasing the degree of burnup of the fuel assembly at the upper portion of the core in which the neutron flux is increased.

In addition, there are cases in which a fuel rod in which only part or whole of the upper and intermediate sections contain the burnable poison, the economical efficiency can be improved. Because of such a fuel rod as described above, the degree of reaction in the lower section of the fuel rod becomes relatively higher than in the lower section from the initial period of the cycle to the intermediate cycle. As a result, from the initial period of the cycle to the intermediate cycle, in the distribution of the output in the axial direction, the lower section reaches a peak and the average void efficiency at the core becomes high so that the neutron spectrum becomes hard and the degree of core reaction which can store PN can be increased. In addition, since the burnable poison has been completely burned at the end of the cycle, the burnup in the lower section is carried out from the first period of the cycle to the intermediate cycle and the above described distribution of concentration is such that the concentration in the upper section is higher than in the lower section and the upper section reaches its peak in the distribution in the axial direction. Moreover, due to the effect of the fuel rod of the type described above, the degree of reaction at the core at a low temperature can be decreased so that the reactor shut-down margin can be improved.

FIGS. 13(*a*), (*b*), (*c*) and (*d*) illustrate the distributions of the concentration in the axial direction of the fuel assembly and the distributions of the burnable poison in the fuel rod containing the burnable poison in accordance with the present invention. FIG. 13(a) illustrates the distribution of the average enrichment across a section of the assembly and FIGS. (ii) and (iii) show the distributions of the fuel rods containing the inflammable poison.

2. Core of Nuclear Reactor

In the nuclear reactor loaded with the fuel assembly of the type described above, the present invention can provide a very economical reactor like the above mentioned fuel assembly and can improve the coefficient of utilization of the nuclear power due to the reduction of period inspection and maintenance.

(1) Loading Of The Fuel Having A High Degree Of Burnup Around The Outermost Periphery Of the Core In the nuclear reactor in accordance with the present invention, the fuel which has been burned to some extent in the center portion of the core is loaded around the outermost periphery of the core and the new fuel and the fuel which has been burned to a lesser extent are loaded at the center of the core. It follows therefore that the quantity of U-235 is increased at the central portion of the furnace in which the neutron flux is high and moreover the leakage of neutron to the exterior can be reduced to a minimum. In addition, the degree of burnup at the core can be increased. FIG. 17 illustrates the relationship between the output peaking in accordance with the above described fuel loading method and the economical effect of the fuel.

(2) 2 Type Loading Of Inflammable Poisons

The fuel for the nuclear reactor in accordance with the present invention comprises the above-described two kinds of fuel assemblies which have different quantities of burnable poison. Of the new fuels, the fuel containing less burnable poison is loaded around the periphery of the core while the fuel containing more burnable poison is loaded at the center portion of the core. As compared with the center portion of the core, the output is relatively less so that the burnup of the burnable poison is slow. As a result according to the loading method of the new fuel in accordance with the present invention, at the end of the cycle, the quantity of the burnable poison which has not burned can be decreased and the degree of reaction at the core can be improved.

Furthermore, in the reactor in accordance with the present invention, during operation, the excess reactivity when fuels each having a different quantity of the burnable poison are prepared and the difference in the degree of reaction until the burnable poison has been completely burned up, is utilized to improve the ratio for the loading new fuel and therefore adjust the degree of burnup at the core. As a result, the adjustment of the degree of burnup at the core due to the variations of the operation and the like can be carried out easily.

Furthermore, in the nuclear reactor in accordance with the present invention, the excess reactivity for adjusting the control rods during the operation can be suitably adjusted. In addition, the number of the control rods used in the operation can be decreased to a minimum so that the number of control rods to be replaced can be reduced to a minimum.

(3) Loading Of Control Cell And Minimal Fuel Shuffling

In the nuclear reactor in accordance with the present invention, the fuel adjacent to the control rods inserted during the operation is a fuel whose degree of burnup has been carried out to some extent (to be referred as the control cell hereinafter in this specification).

In the nuclear power plant, part of the fuel is generally replaced by new fuel at every inspection or maintenance period. In this case, the transfer of the fuel to be reused is carried out simultaneously (which is referred to as "fuel shuffling" in this specification). In the nuclear reactor in accordance with the present invention, transfer except for the transfer of the control cells and the fuel to the outermost periphery of the core is basically not carried out. As a result, the time required for carrying out fuel shuffling during periodical inspection and maintenance is shortened so that the inspection and maintenance period can also be shortened.

DESCRIPTION OF THE PREFERRED EMBODIMENT

Figure 1:
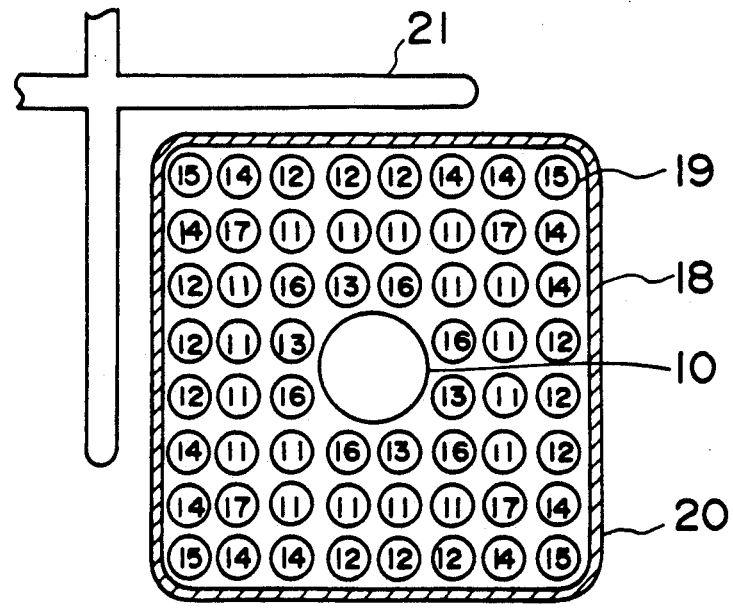
FIG. 1 is a cross sectional view illustrating a preferred embodiment of a fuel assembly in accordance with the present invention which is loaded in the boiling water reactor.
Figure 2:
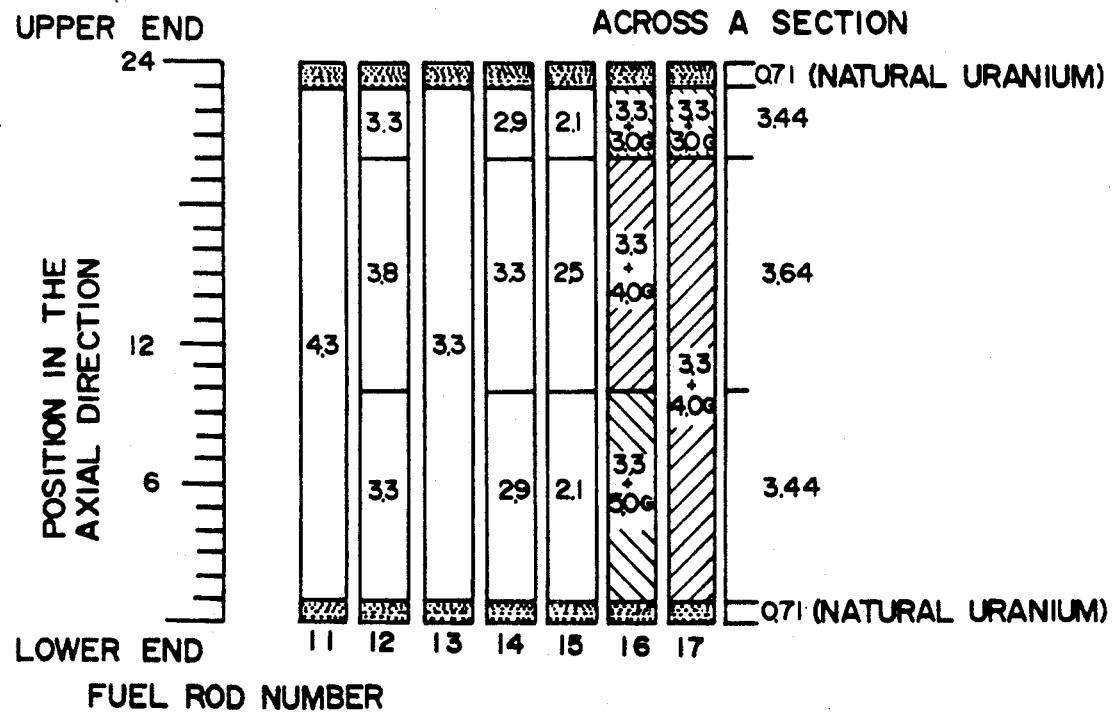
FIG. 2 is a view used to explain the degree of enrichment of the fuel rods constituting the fuel assembly and the distribution of gadolinium.

Referring first to FIGS. 1 and 2, a preferred embodiment of the present invention will be described. A fuel assembly in accordance with the present invention generally indicated by the reference numeral 18 comprises fuel rods 19, a channel box 20, a water rod 10 and lower and higher tie plates (not shown). The upper and lower ends of the fuel rods 19 and the water rod 10 are attached to the upper and lower tie plates, respectively. A plurality of spacers are disposed in the axial direction of the fuel rods 19 so that the distance between each fuel rod and the water rod 10 is suitably maintained. The channel box 20 is attached to the upper tie plate and surrounds the outer periphery of the bundle of the fuel rods 19 held by the spacers. The channel fastener is attached to the upper tie plate and the control rod 21 is inserted in the vicinity of the channel box 20.

The fuel rod 19 consists of a cladding pipe or sheath which is filled with a plurality of fuel pellets and whose upper and lower ends are tightly sealed with the upper and lower plugs. The fuel pellet consists of $UO_2$ which is a fuel substance and contains $U^{235}$ which is a fission material. A bias spring is loaded into the gas plenum to force the fuel pellets downward.

The water rod 10 uses cladding sheath substantially similar to that of the fuel rod 19 and has holes extended through the peripheral wall of the sheath (not shown) at the upper and lower ends portion thereof so that the coolant for preventing the boiling of water within the sheath can flow through the sheath.

The control rod 21 in the form of a cross is inserted into the core for every four fuel assemblies. In general, cores are divided into two types. One (D-lattice core) is such that the width of the water gap defined on the side of the peripheral wall of the fuel assembly in opposing relationship with the control rod is greater than the width of the water gap defined on the side of the peripheral wall and not in opposing relationship with the control rod. The other (C lattice core) is such that the width of the water gap defined on the side of the peripheral wall of the fuel assembly in opposing relationship with the control rod is equal to the width of the water gap defined on the side of the peripheral wall of the fuel assembly not in opposing relationship with the control rod.

The fuel assembly 18 in accordance with the present invention is loaded into the C-lattice core. As best shown in FIG. 2, the fuel assembly 18 comprises seven kinds of fuel rods 11-17 which are disposed within the channel box 20 as shown in FIG. 1. In this embodiment, the water rod has a large diameter so that it occupies the space into which four fuel rods can be inserted and is disposed at the center of the assembly. As a result, the ratio between the water and fuel becomes higher as compared with the conventional fuel assembly so that the degradation of the core characteristics due to the high burnup rate can be eliminated and simultaneously, the reactivity can be improved.

Figure 15:
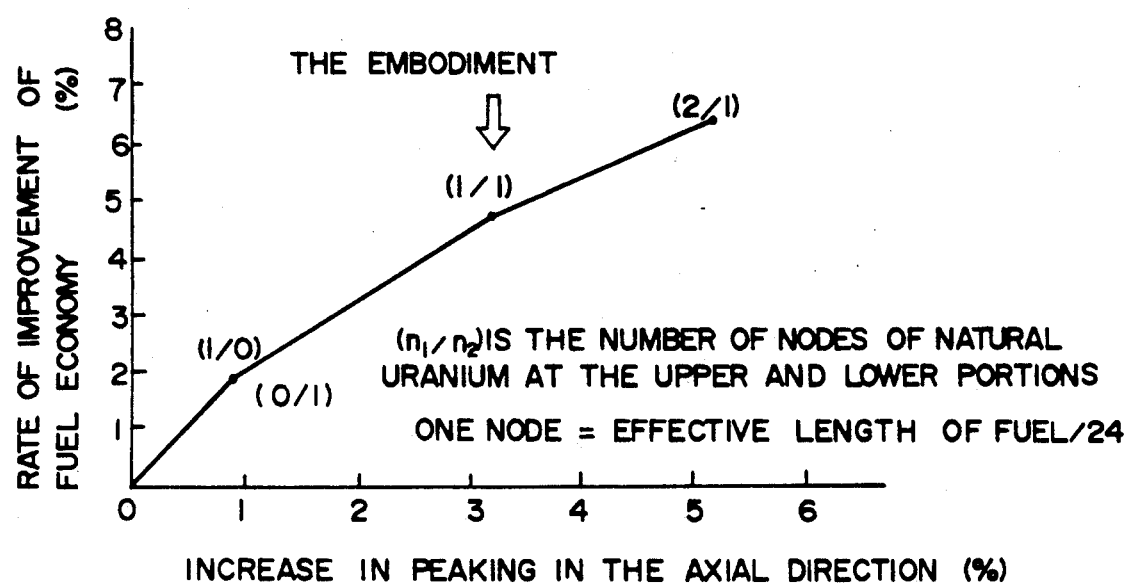
FIG. 15 is a characteristic view illustrating the relationship between the rate of increase of the output peak at a length in the axial direction of a natural uranium bracket and the degree of the fuel economy improvement effect.
Figure 16:
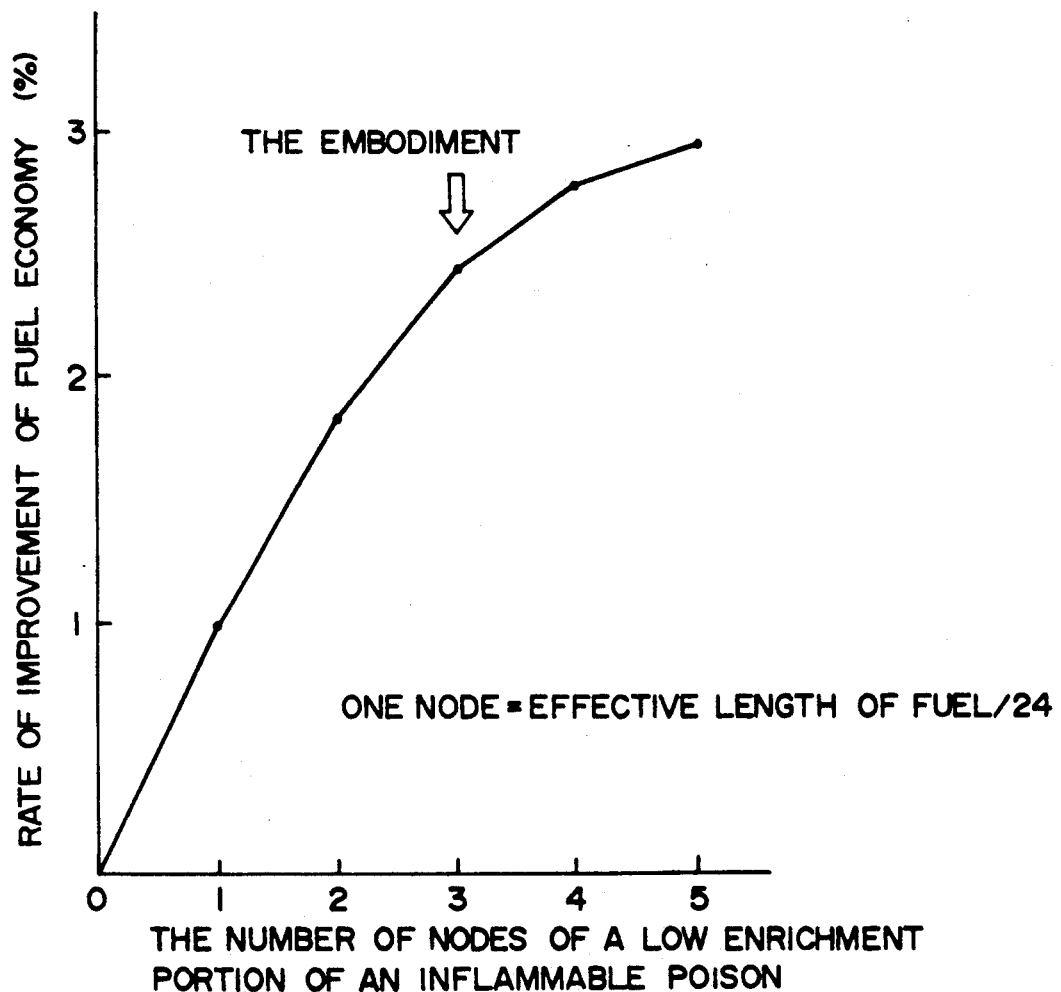
FIG. 16 is a view illustrating the relationship between the axial length of the low gadolinium concentration section.

Each of the fuel rods 11-17 is provided with the section (to be referred as "the natural uranium bracket section" hereinafter in this specification) filled with the fuel pellets consisting of natural uranium at each of the upper and lower end sections of the section filled with the fuel material. The length (to be referred as "the effective length H of fuel" hereinafter in this specification) in the axial direction of each natural bracket is equal to 1/24 of the axial length of the section filled with the fuel material from its upper end to its lower end. In the present embodiment, as shown in FIG. 15, the axial length of the natural uranium bracket is 1/24 of the effective length H so that the fuel economy can be improved remarkably. The section filled with the fuel material means a section which is filled with the fuel pellets and the axial length of the section filled with the fuel material of the fuel rod is same.

In the case of the fuel rods 11-17, 1/24–23/24 of the section having the fuel length H from the lower end thereof is an enriched uranium section filled with enriched uranium. As best shown in FIG. 2, the fuel rods 11, 13, 16 and 17, the enriched uranium section has a uniform enrichment in the axial direction, but the fuel rods 12, 14 and 15 have three sections in each of which the degree of enrichment is different in the axial direction. The degree of enrichment in the enriched section of each fuel rod is as follows:

(a) 4.3% in weight in the fuel rod 11, and
(b) 3.3% in weight in the fuel rods 13, 16 and 17.

In the case of the fuel rod 12, 1/24–10/24 of the fuel effective length H measured from the lower end of the section filled with the fuel material has the degree of enrichment 3.3% by weight, 10/24–20/24 of effective length H has the concentration of 3.8% in weight and 20/24–23/24 of the effective length H has 3.3% by weight. In like manner, the fuel rod 14 has 2.9%, 3.3% and 2.9%, respectively and the fuel rod 15 has 2.1%, 2.5% and 2.1% in weight, respectively. The fuel pellets in the enriched uranium section of the fuel rod 16 contains gadolinium which is a poison. As to the concentration in the axial direction of the enriched uranium section, 1/24–10/24 of the effective length H is 5.0% by weight, 10/24–20/24 of the effective length has the concentration of 4.0% by weight and 20/24–23/24 of the section has the concentration 3.0% by weight. In the case of the fuel rod 17, 1/24–20/24 of the effective length measured from the lower end of the section filled with the fuel material has the concentration of 4.0% by weight and 20/24–23/24 of the effective length H has the concentration of 3.0% by weight. The fuel rods 11-15 do not contain gadolinium.

When the fuel rods 11-17 having the above described axial concentration distributions are disposed as shown in FIG. 1, the distribution of the average concentration across a cross section and in the axial direction becomes as follows. 1/24–10/24 of the effective length measured from the lower end of the section filled with the fuel material, that is the lowermost section of the enriched section has the average enrichment of 3.44% by weight, 10/24–20/24 of the effective length H, that is, the intermediate section of the enriched uranium section has the degree of enrichment of 3.64% by weight, and 20/24–23/24 of the effective length H, that is, the uppermost section of the enriched uranium section has the average enrichment of 3.44% by weight.

In the case of the fuel assembly 18, the natural uranium bracket sections defined at the upper and lower ends of the section filled with the fuel material contain 0.71% by weight of $U^{235}$.

In the fuel assembly 18 in accordance with the present invention, the average enrichment across a cross section in the lowermost section of the enriched uranium section is made lower while the average enrichment across a cross section of the intermediate section is made higher and the difference in the degree of enrichment between these sections is about 0.2% in weight.

The higher the core of the boiling water reactor, the more the voids are increased. The low density of water which is a neutron modulator is decreased at the upper portion of the core. As a result, when the fuel assembly whose degree of enrichment in the axial direction is uniform is loaded in the core, there exists the tendency that the lower-distortion distribution in which the output peak occurs at the lower portion of the fuel assembly. It follows therefore that, as described above, the degree of enrichment at the upper portion of the assembly is made higher than that at the lower portion of the assembly so that the output distribution in the axial direction of the fuel assembly can be made flat. In the fuel assembly 18 in this embodiment, the difference of about 0.2% in the average enrichment between the intermediate and upper portions of the fuel assembly 18 and the positions (at 10/24 of the effective length H measured from the lower end of the section filled with the fuel material) of the intermediate and lowermost sections are so selected that the effect of the flat output distribution in the axial direction becomes most effective.

In the fuel assembly in this embodiment, the average percent by weight of ten fuel rods containing gadolinium is such that the average percent in weight in the lowermost section is made high while the average percent in weight is made low so that there exists the difference of about 5% between these sections. As described above, the higher the core of the boiling water reactor, the more the voids are produced so that the density of water which is a neutron modulator becomes lower in the upper portion of the core while the density of water is high in the lower portion of the core. Therefore, when the average percent by weight of gadolinium in the axial direction is made uniform, the neutron spectrum becomes more soft in the lower portion of the core than that in the upper portion thereof so that the combustion of gadolinium becomes faster. Then in the case of the continuous combustion of gadolinium, the increase rate of reactivity becomes faster so that the output distribution in the axial direction has a peak at the lower section of the core. According to the present invention, in order to control suitably the output distribution the enrichment in the lowermost section of the core is increased. The difference in enrichment of 5% is selected so that the flattening effect of the axial average output distribution becomes most effective. In the embodiment, there are two kinds of fuel rods containing gadolinium because of the consideration of the production of fuel so that the difference in the concentration of gadolinium in each fuel rod has a difference in excess of about one percent by weight. The output peaking margin of the fuel assembly 18 obtained by the distribution of enrichment and the distribution of the concentration of gadolinium in the axial direction becomes about 15-20%. The output peaking margin of the fuel assembly 18 is disposed around the outermost periphery of the high burnup section. Thus, the fuel assembly 18 in accordance with the present invention can attain the reactivity gains described above in 1-(3).

The fuel assembly with the above-described construction can remarkably improve the economy of fuel and can attain a desired degree of burnup with the enrichment as low as possible while sufficiently securing the safety margin of the nuclear reactor. Thus the cost required for the fuel cycle can be considerably reduced and the quantity of the used fuel assemblies can be remarkably decreased.

Figure 3:
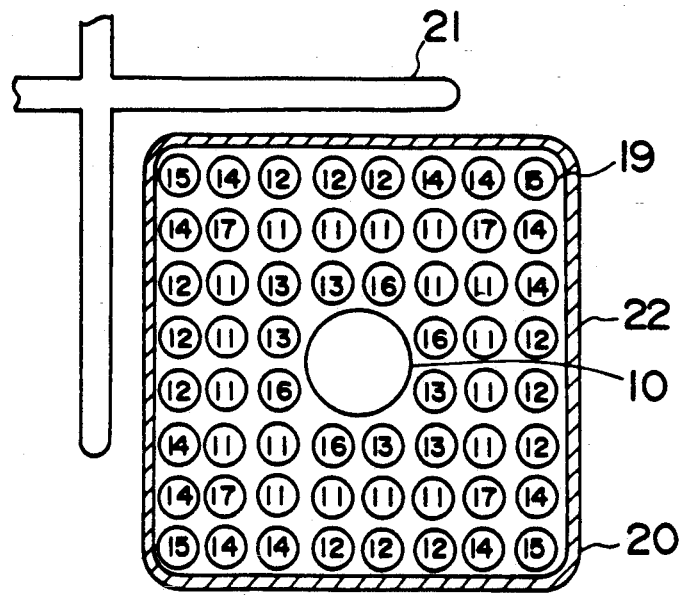
FIGS. 3, 5, 7, 9 and 11 are sectional views, respectively, of other preferred embodiments of the present invention.
Figure 4:
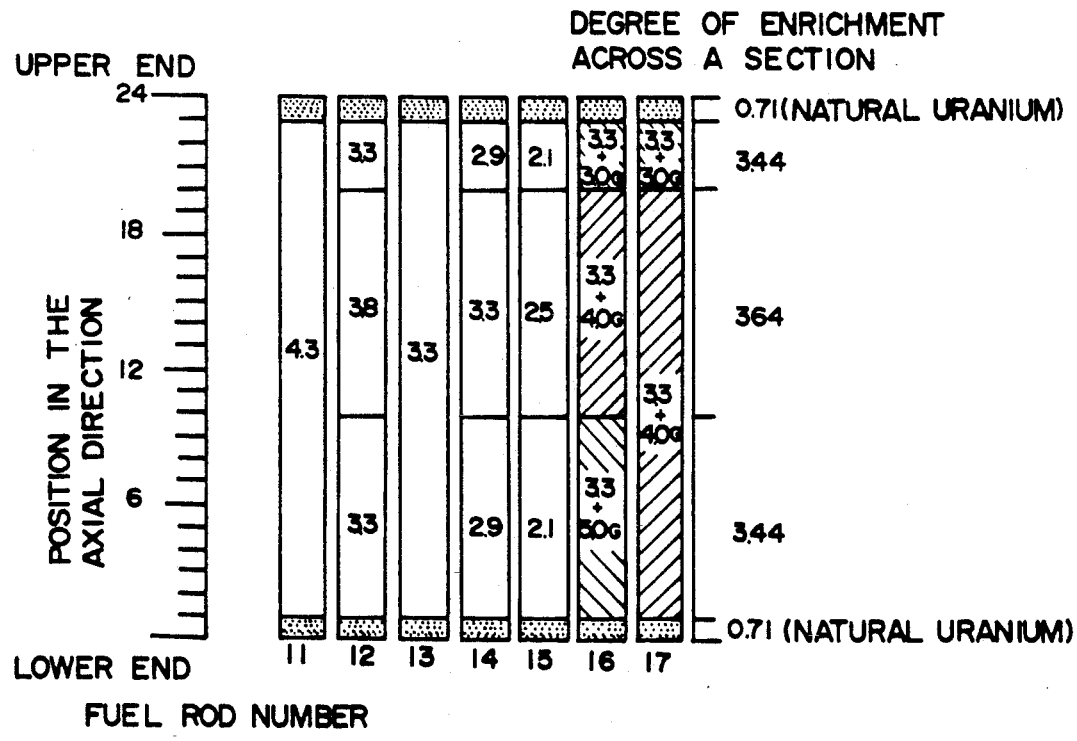
FIGS. 4, 6, 8, 10 and 12 are views used to explain the degree of enrichment and the conception of the gadolinium distribution of the fuel rods shown in FIGS. 3, 5, 8, 9 and 11, respectively.
Figure 5:
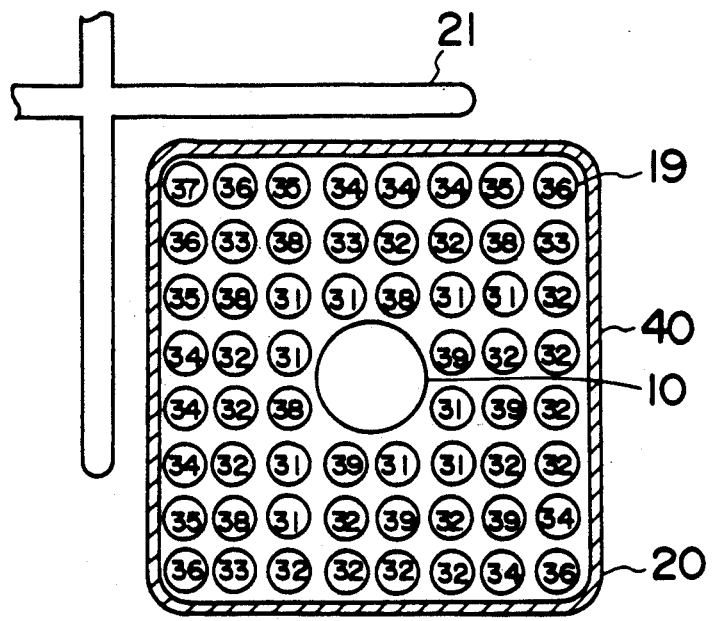

Next referring to FIGS. 3 and 4, another or a second preferred embodiment of the present invention will be described. In the second embodiment, the fuel assembly 22 is substantially similar in construction and mode of operation to the fuel assembly 18 and is loaded in the C lattice core as in the case of the fuel assembly 18. The fuel rods 11-15 shown in FIG. 5 are substantially similar to those shown in FIG. 2, but the number of fuel rods 13 and 16 is different from that shown in FIG. 2. That is, the enrichment distribution and the gadolinium concentration distribution in the axial direction are substantially similar to those described above, but the number of the fuel rods 13 and 16 is different from that of the first embodiment described above with reference to FIGS. 1 and 2.

The fuel assemblies 22 of the second embodiment can attain the similar effects of the first embodiment.

Figure 6:
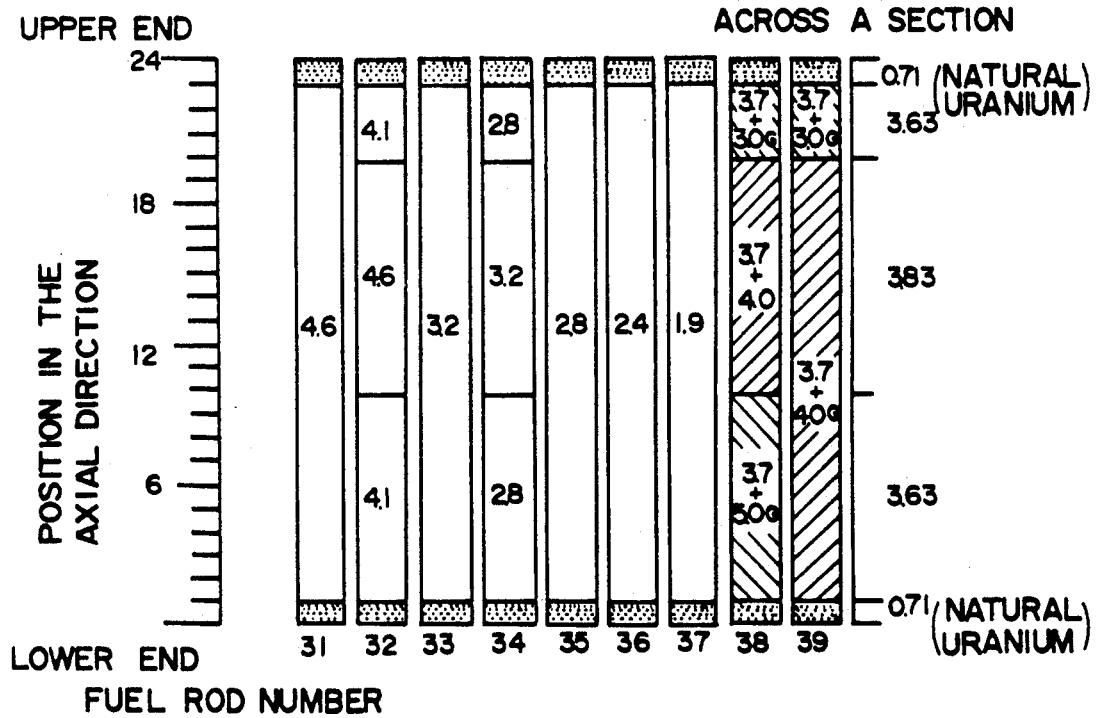

Next referring to FIGS. 5 and 6, a third embodiment of the fuel assembly in accordance with the present invention will be described hereinafter. In this embodiment, the fuel assembly 40 is applied to the D lattice core and comprises 9 types of fuel rods shown in FIG. 6 and are disposed as shown in FIG. 5. Each of the fuel rods 31-39 has the natural brackets in the axial direction at the upper and lower ends of the section filled with the fuel material like FIG. 2. As best shown in FIG. 6, the degrees of enrichment in the enriched uranium section spaced apart from the end of the section filled with the fuel material by 1/24-23/24 of the effective length H are 4.6, 3.2, 2.8, 2.4, 1.9, 3.7 and 3.7% by weight in the fuel rods 31, 33, 35-39, respectively. The enriched uranium sections of these fuel rods have a uniform enrichment in the axial direction. Like the fuel rod 12, the enriched uranium section of each of the fuel rods 32 and 34 comprises three sub-sections each having a different degree of enrichment. More particularly, the section spaced apart from the lower end of the section filled with the fuel material by 1/24-10/24 of the effective length H of the enriched uranium section and the section (the uppermost section of the enriched uranium section) also spaced apart from the low end of the section filled with the fuel material have the degrees of enrichment of 4.1% by weight in the fuel rod 32 and 2.8% by weight in the fuel rod 34. The average degree of the enrichment in the intermediate section of the enriched uranium section is 3.8% by weight.

The distribution of the concentration of gadolinium in the axial direction of the fuel rod 38 is similar to that of the fuel rod 16 and the distribution of gadolinium in the fuel rod 39 is similar to that of the fuel rod 17.

The fuel assembly 40 can attain the effects substantially similar to those of the fuel assembly 16.

Figure 7:
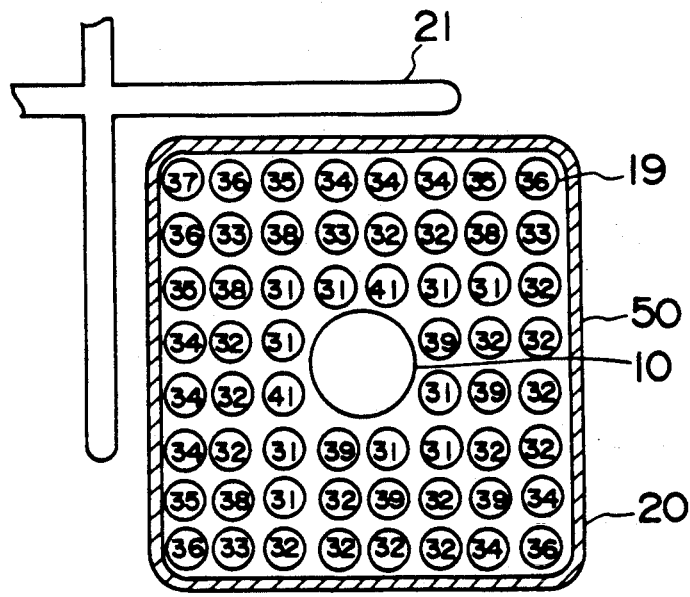
Figure 8:
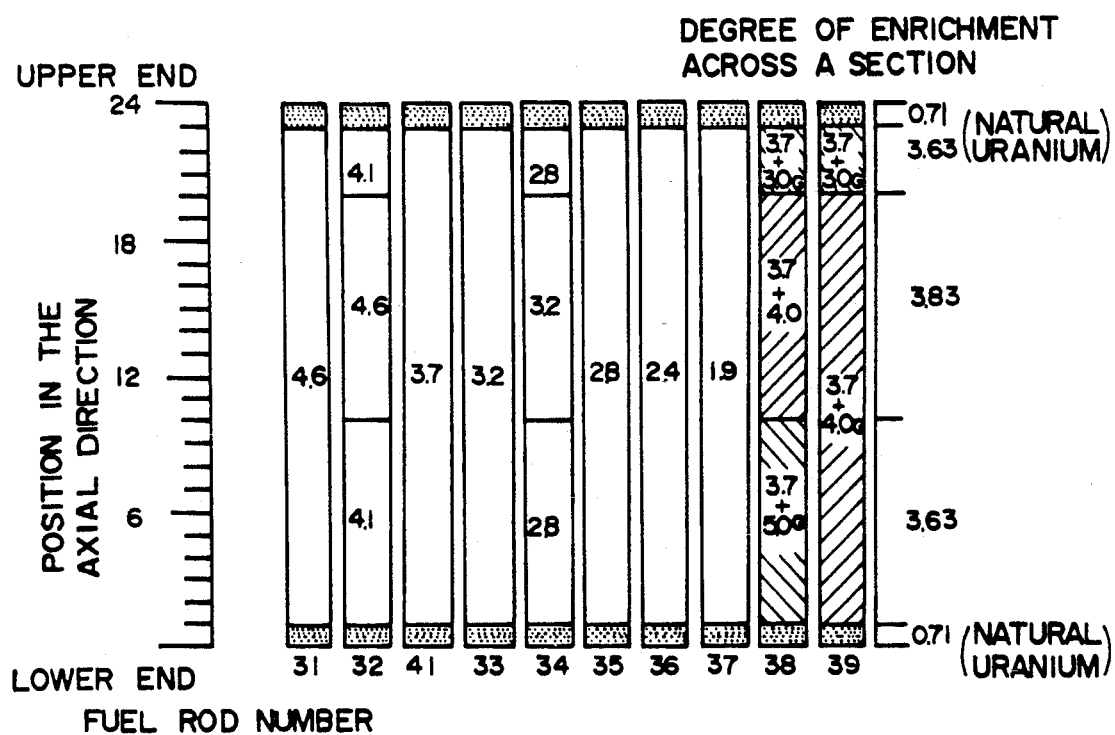

Referring next to FIGS. 7 and 8, the fuel assembly 50 applied to the D lattice core will be described. The fuel assembly 50 comprises ten types of fuel rods as shown in FIG. 8 and disposed as shown in FIG. 7. The fuel rod 41 shown in FIG. 8 has the degree of enrichment of 3.7% by weight in the enriched uranium section. As shown in FIG. 8, the distribution of the average degree of enrichment in the axial direction of the fuel assembly 20 is substantially similar to that of the fuel assembly 40, but the fuel assembly 50 has a different number of fuel rods 38.

The fuel assembly 50 can attain the effects substantially similar to those of the fuel assembly 18.

Figure 9:
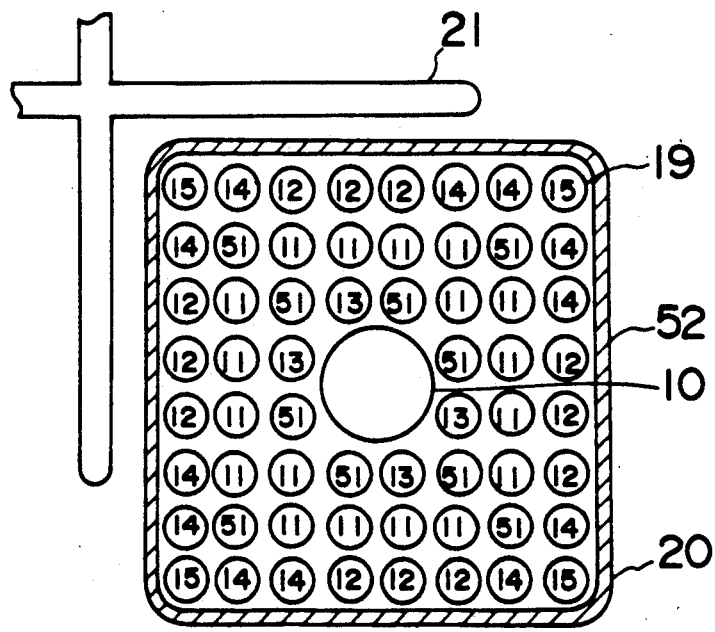
Figure 10:
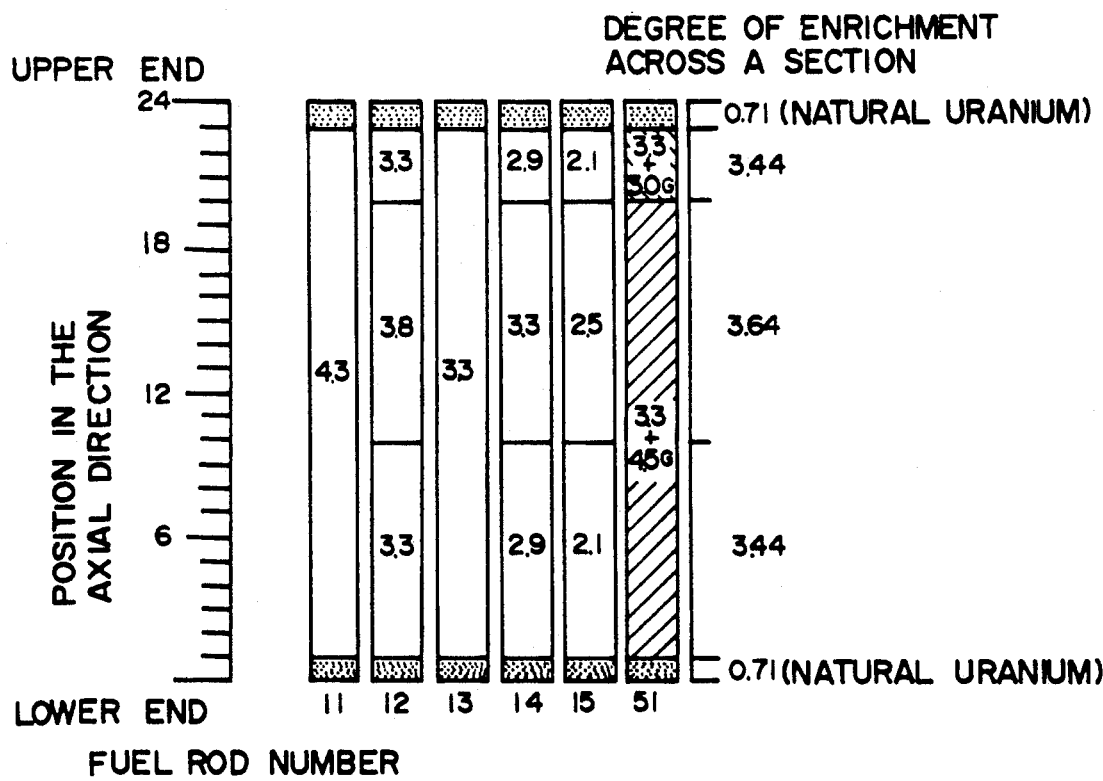

The fuel assembly 52 illustrated in FIGS. 9 and 10 is an embodiment of the distributions in the axial direction of the inflammable poison in the four sections shown in 1-(4) The fuel assembly 52 comprises 6 types of fuel rods shown in FIG. 10 and disposed as shown in FIG. 9. The fuel rod 51 is substantially similar to the fuel rod 16 except the distribution of gadolinium. More particularly, the concentration of gadolinium is 4.5% by weight and is distributed uniformly in the section spaced apart from the lower end of the section filled with the fuel material by 1/24–20/24 of the effective length H.

The fuel assembly 52 can also attain effects substantially similar to those of the fuel assembly 18. In addition, since the fuel assembly 52 has the distribution of the concentration of gadolinium as described above, the degree of reactivity of the fuel assembly at the upper portion of the core in which the neutron flux becomes higher at low temperatures so that the shut-down margin can be improved.

Figure 11:
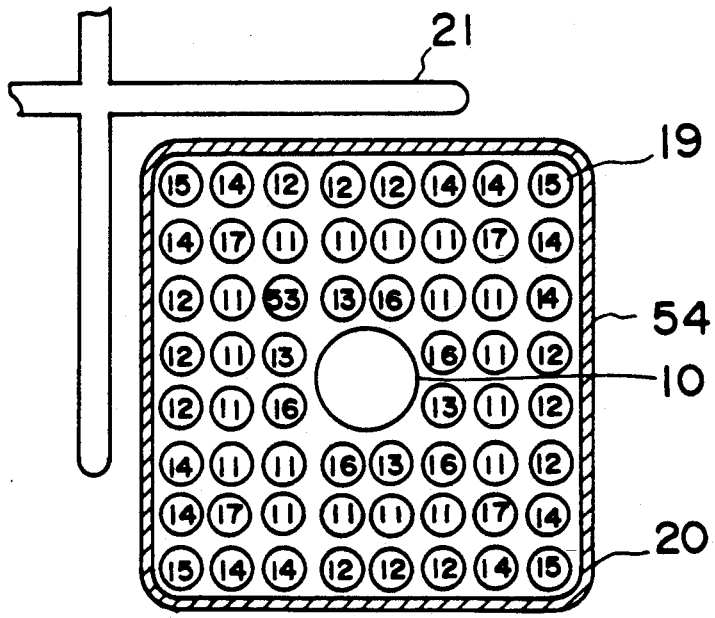
Figure 12:
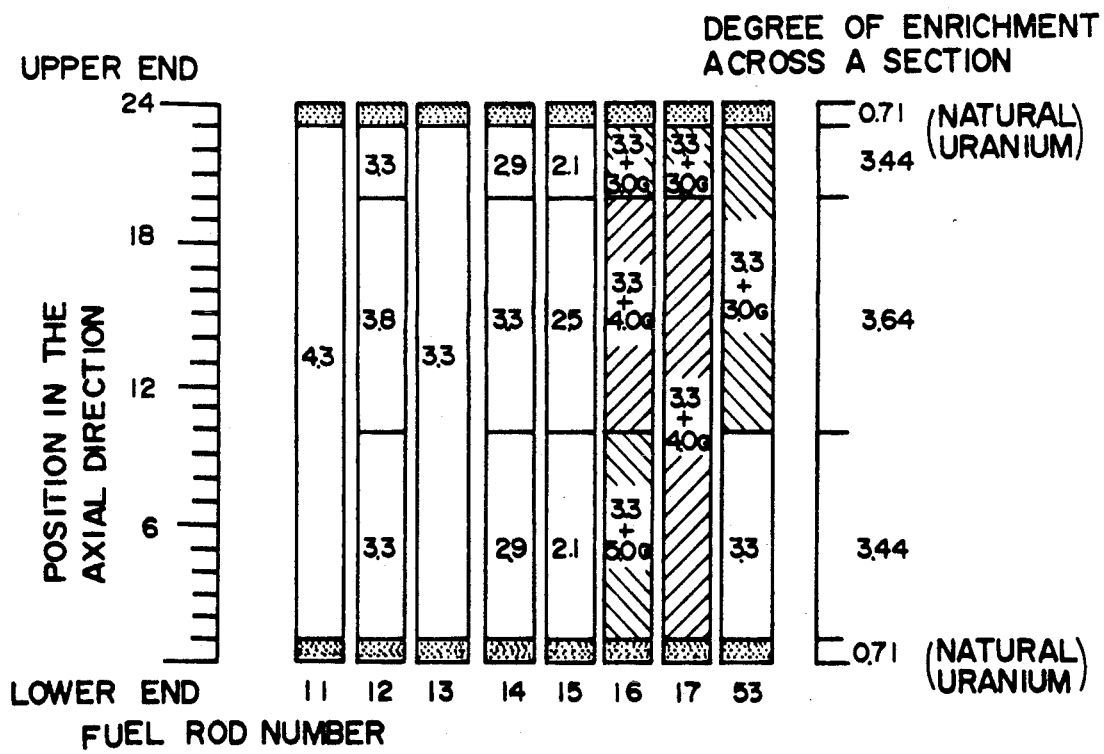
Figure 13B:
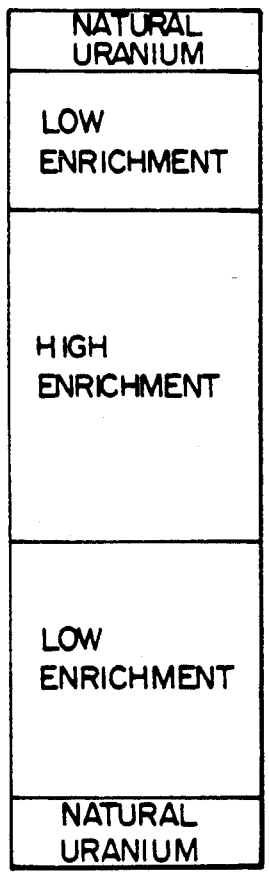
FIGS. 13(a), (b), (c) and (d) are views to explain the conception of the degree of enrichment of the fuel assembly and the distribution of gadolinium, (i) illustrating the distribution of the average degree of enrichment across a cross section of the assembly and (ii) and (iii) illustrating the distributions of the burnable poison of the fuel rods containing the inflammable poison.
Figure 13B:
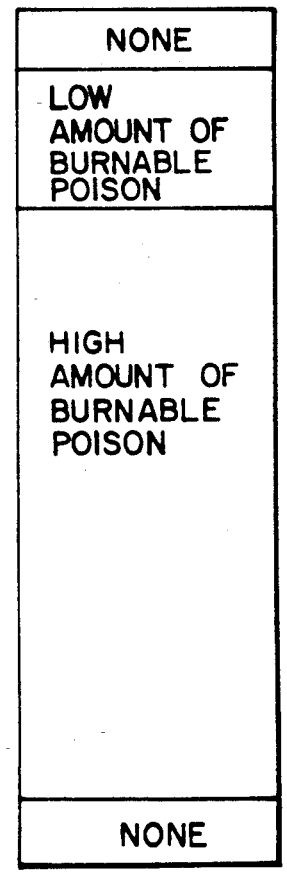
Figure 13D:
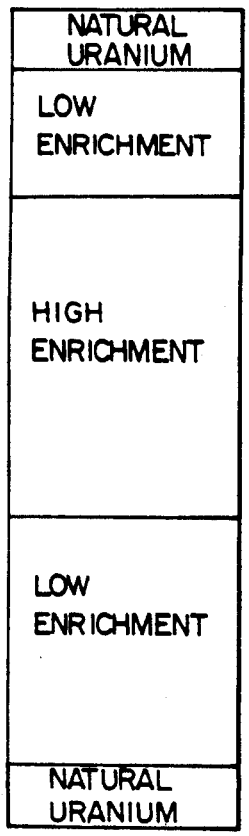
Figure 13D:
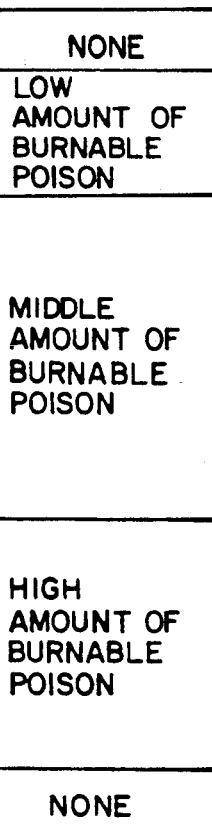
Figure 13D:

FIGS. 11 and 12 illustrates an embodiment embodying the distribution of the burnable poison described above in 1-(4) The fuel assembly 54 comprises 8 kinds of fuel rods as shown in FIG. 12 and disposed as shown in FIG. 11. The fuel rod 53 is substantially similar to the fuel rod 16 except the distribution of gadolinium. More particularly, the section with a length 10/24–23/24 of the effective length H measured from the lower end of the section filled with the fuel material has the concentration of 3.0% by weight of gadolinium.

The fuel assembly 54 can also attain the effects substantially similar to those of the fuel assembly 16. In addition, since the fuel assembly 54 has the distribution of concentration of gadolinium as described above in 1-(4), the reactivity of the fuel can be improved so that the fuel economy can be improved and at low temperatures the reactivity of the fuel assembly is lowered at the top portion of the core in which the neutron flux becomes high at low temperature so that the shut-down margin can be improved.

In this embodiment, the section of 10/24–23/24 of the effective length H has the gadolinium concentration of 3.0% by weight, even when the section of 10/24–23/24 of the effective length H has a portion in which the concentration of gadolinium is 3.0%, effects substantially similar to those of the fuel assembly 54 can be attained.

Figure 14:
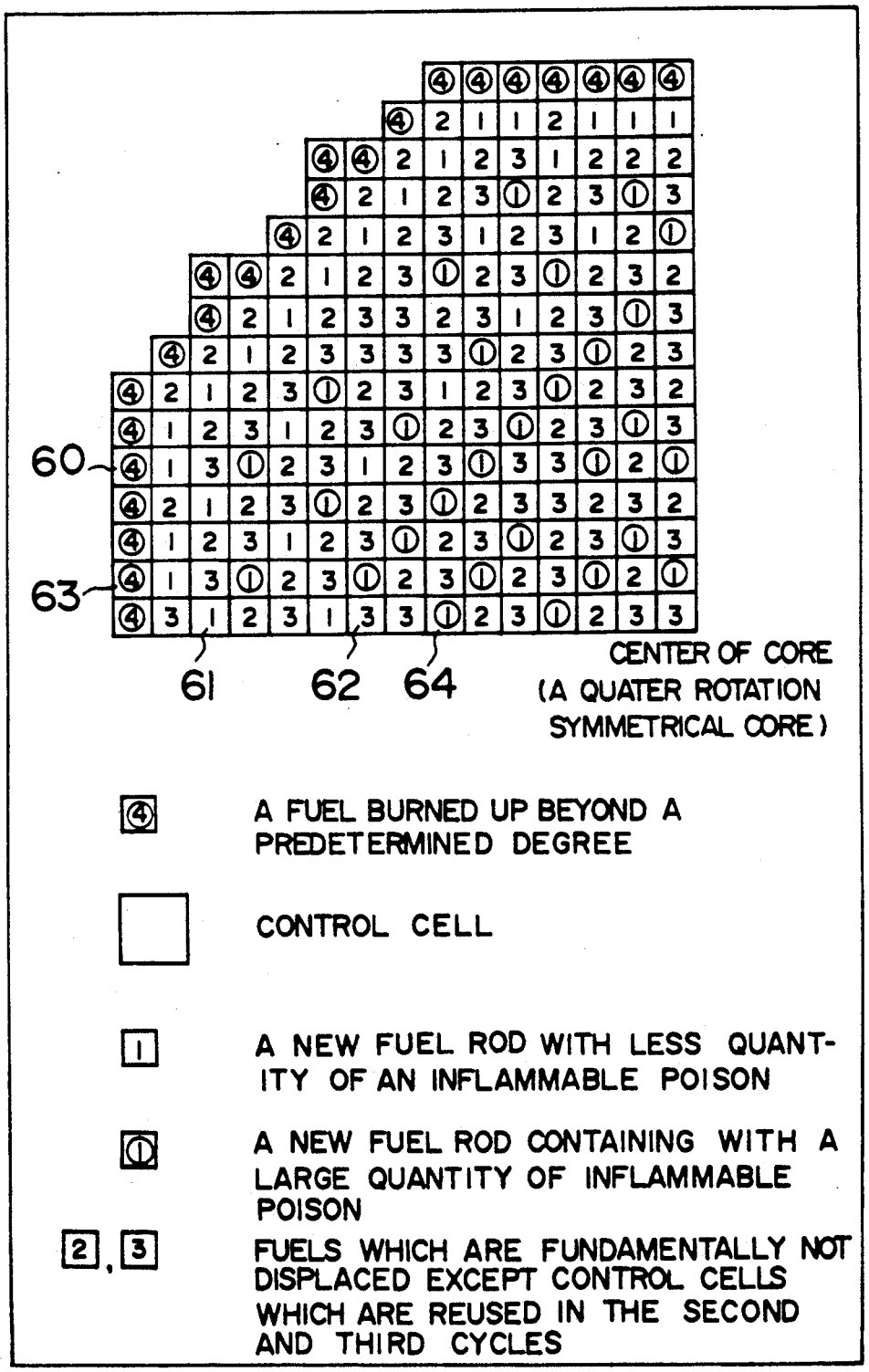
FIG. 14 is a cross sectional view of ¼ of the core of a boiling water reactor of a preferred embodiment of the present invention.

A preferred embodiment of a boiling water reactor in accordance with the present invention will be described. The reactor has a C lattice core 60 as shown in FIG. 14, which illustrates only one quarter of the cross section of the core 60. In FIG. 14, one square section indicates one fuel assembly and the numbers 1–4 written in the square sections indicates the period of time during which the fuel assembly has been inserted into the core. More particularly, 1 indicates the fuel assembly during one cycle of the operation cycle; 2, the fuel assembly during the second cycle of the operation cycle; 3, the fuel assembly during the third cycle of the operation cycle and 4, the fuel assembly during the fourth cycle of the operation cycle. In this specification, the operation cycle is defined as the period of time from the start to the shut-down of the boiling water reactor. The higher the number of cycle, the higher the degree of fuel.

The fuel assembly 61 (the fuel assemblies with the number 1 in the square sections) is a new fuel assembly and uses a fuel assembly 22 containing a lesser number of fuel rods containing gadolinium (In the case of the D lattice core, the fuel assembly 50). The fuel assembly 64 (the fuel assemblies with the number ①) is a new fuel assembly and uses a fuel assembly 18 having a relatively many fuel rods containing gadolinium (D lattice core contains 40 fuel assemblies). Of the fuel assemblies 61 and 64, more fuel assemblies 61 are disposed around the outer periphery of the core 60 and in the center of the core 60, many fuel assemblies 64 are loaded. The fuel assembly 62 comprises a control cell into which are inserted the control rods for the adjustment of the output obtained from the nuclear reactor. The control cell is provided in order to facilitate the operation of the control rods for adjusting the output derived from the nuclear reactor and the reactivity during the operation of the boiling water reactor. The fuel assemblies 62 and 63 (the fuel assemblies with the number ④ in the square sections) are those with the high degree of burnup which have undergone more than three cycles of the operation cycle. The fuel assemblies in the core which have undergone two and three cycles, respectively, are the fuel assemblies 61 and 64 which have undergone the burnup period and in which gadolinium has been substantially burned.

Figure 17:
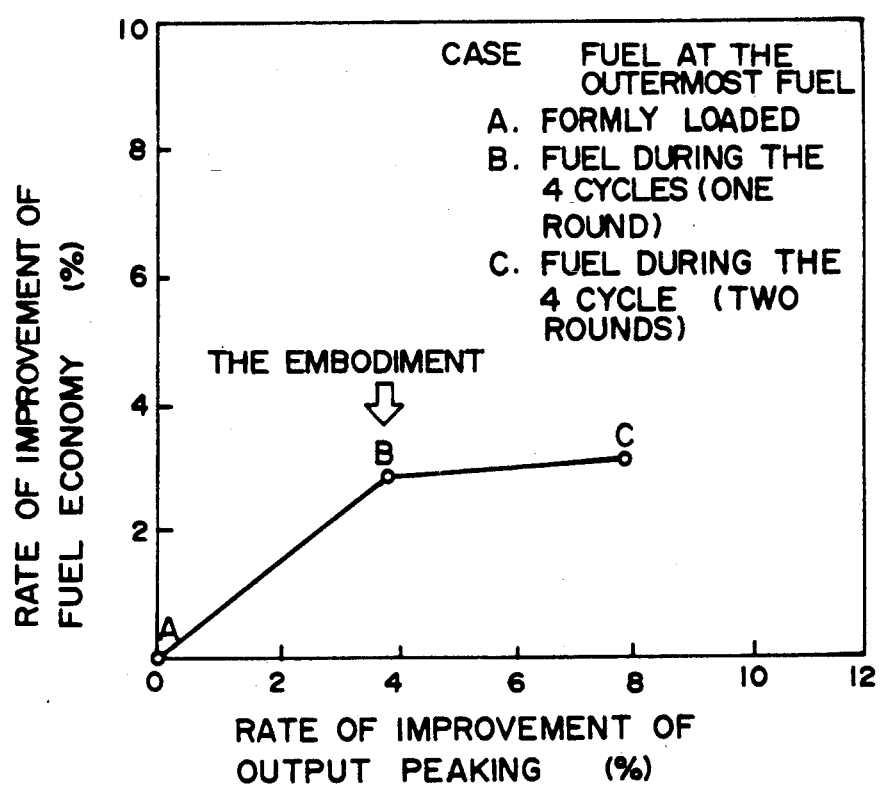
FIG. 17 is a characteristic view illustrating the relationship between the arrangement of the fuel assembly having a high degree of burnup and the fuel economy improvement effect.
Figure 18:
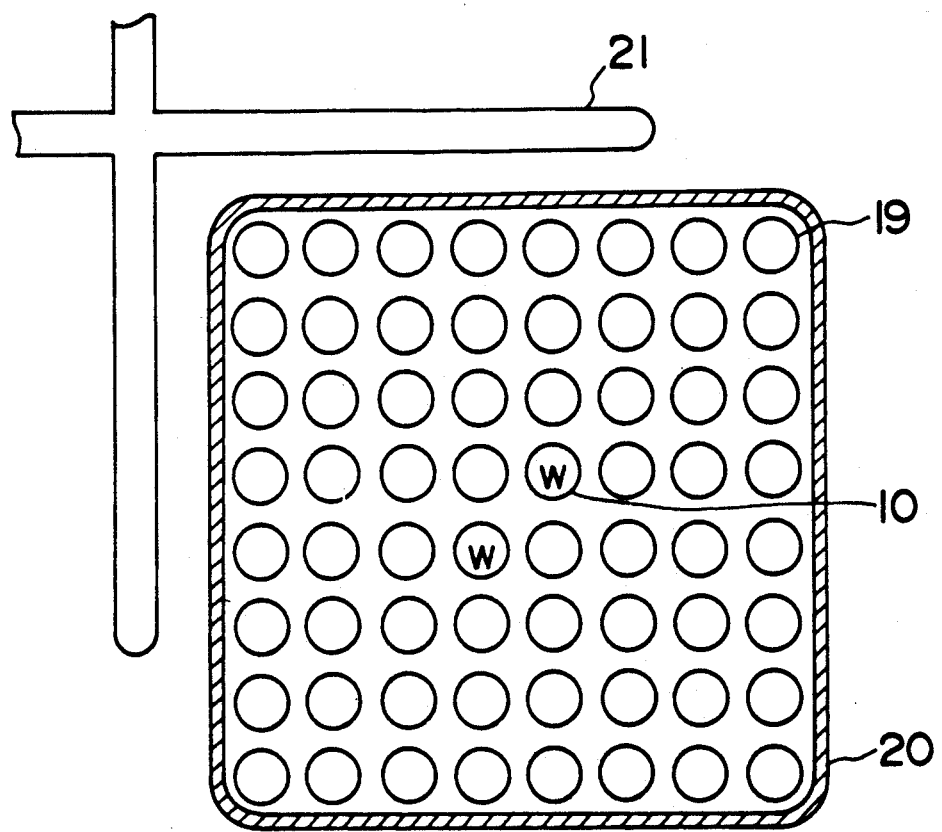
FIG. 18 is a sectional view illustrating one example of the conventional fuel assemblies.

The fuel assembly with a high degree of burnup and containing less $U^{235}$ is loaded at the outermost periphery in the axial direction of the core. The fuel assemblies 61 and 64 containing a large quantity of $U^{235}$ are loaded at the center of the core 60. The core with the above-mentioned construction can attain the reactivity gain explained in 2-(2). The case a) is such that the four-cycle fuel assemblies 63 are uniformly loaded at the center of the core 60 as a reference mode. FIG. 17 illustrates the relationship between the number of the fuel assemblies 63 loaded around the outermost periphery of the core 60 and the fuel economy improvement. More particularly, FIG. 17 shows that the degree of the improvement of the fuel economy when the fuel assemblies 63 are loaded one circle of the outermost periphery of the core 60 (the case b) and the fuel assemblies 63 are loaded twice around the outermost periphery of the core 60 (case c) when the number of rows of the fuel assemblies loaded around the outermost periphery of the core 60 is increased, the rate of increase in output peaking is also increased accordingly. However, the degree of improvement of fuel economy remains almost unchanged even when more than one round of the fuel assemblies 63 are loaded along the outermost periphery of the core 60. It follows that according to the present invention, one row of the fuel assemblies 63 are loaded around the outermost periphery of the core 60 like the case b).

In the case of the present embodiment of the boiling water reactor, the number of the fuel assemblies 61 each of which has a small number of fuel rods containing gadolinium and is loaded around in the vicinity of the outer periphery of the core 60, is higher than the number of the fuel assemblies 64 each containing a large number of fuel rods so that the effect described in 2-(2) can be attained. More specifically, the flexibility of the period of operation time of the boiling water reactor can be improved and the reactivity gain can be attained.

Except for the outermost periphery of the core 60 and the control cell, the section in which fuel shuffling is not carried out is called the non-shuffling section. The fuel assemblies 63 and 62 loaded around the outermost periphery of the core 60 and the control cell are unloaded from the core 60 after the end of the four cycle operation time. The fuel assemblies which has already undergone three operation cycles are unloaded from the core and are disposed around the control cell and the outermost periphery of the core 60 as the fuel assemblies 62 and 63 which have been already unloaded from the core 60. The new fuel assemblies (18 and 22) which are not radiated are loaded at the positions of the fuel assemblies which have been unloaded from the core and burned up to some extent and undergone three cycles so that the shuffling of the fuel assemblies can be reduced to a minimum and consequently the time required for the replacement of the fuel assemblies can be shortened, whereby the rate of utilization of the boiling water reactor type power generation plant can be improved. When the fuel shuffling does not pass a critical level in the case of the periodical inspection and maintenance, it is apparent that merits such as the flattening the output distribution in the radial direction by fuel shuffling can be utilized.

The boiling water reactor with the above-described core can produce more energy when compared with the conventional boiling water reactor. In addition, the quantity of used fuel assemblies is reduced and the quantity of reprocessing is also decreased.

According to the present invention, the degradation of the performance of the core due to the high degree of burnup can be eliminated, the output peaking margin can be utilized to improvement of fuel economy, and the power derived from the nuclear reactor can be remarkably increased.

What is claimed is:

1. A fuel assembly for a nuclear reactor comprising: a plurality of fuel rods each of which is filled with a fuel material;
a large-diameter water rod which occupies a space substantially equal to that occupied by a plural number of fuel rods,
said plurality of fuel rods defining a section filled with a fuel material comprising a natural uranium section located at least at the upper or lower end of each of said fuel rods and an enriched uranium section consisting of an upper section, an intermediate section and a lower section, each of which have an average enrichment across the cross section of the fuel assembly, wherein said average enrichment in the cross section of the fuel assembly at the upper and lower sections is less than that at the intermediate section, and
said enriched uranium section having at least two sections which include a burnable poison, wherein the respective amounts of the burnable poison per unit length in the axial direction are different such that the amount of said burnable poison per unit length in the axial direction in said upper section is less than the amount of said burnable poison per unit length in the axial direction in said lower section, and
wherein said plurality of fuel rods comprise fuel rods without poison having variations in enrichment between natural uranium sections located at the upper and lower ends of these fuel rods, and fuel rods with poison having the same enrichment between natural uranium sections located at the upper and lower ends of these fuel rods.

2. A fuel assembly as set forth in claim 1, wherein the amount of said burnable poison per unit length in the axial direction in said upper section of said enriched uranium section is lower than the amount of said burnable poison per unit length in the axial direction in said intermediate section.

3. A fuel assembly as set forth in claim 1, wherein the length of said natural uranium section in the axial direction thereof is from 1/24 to 1/12 of the axial length of said section filled with the fuel material.

4. A fuel assembly as set forth in claim 1, wherein the axial length of said upper section of said enriched uranium section is from 3/24 to 5/24 of the axial length of said section filled with the fuel material.

5. A fuel assembly as set forth in claim 1, wherein the boundary between said lower section and said intermediate section of said enriched uranium section is positioned from the lower end of said section filled with the fuel material at a distance of ⅛ to 7/12 of the axial length of said section filled with the fuel material.

6. A fuel assembly as set forth in claim 1 wherein fuel rods each having a section of a high degree of enrichment higher than said average degree of enrichment are loaded around the outermost periphery of the cross section of said fuel assembly.

7. A core of nuclear reactor comprising:
a first fuel assembly comprising a plurality of fuel rods, each of which is filled with a fuel material, and a large-diameter water rod which occupies a space substantially equal to that occupied by a plural number of fuel rods, wherein said first fuel assembly includes a predetermined amount of a burnable poison;
a second fuel assembly comprising a plurality of fuel rods, each of which is filled with a fuel material, and a large diameter water rod which occupies a space substantially equal to that occupied by a plural number of fuel rods, wherein said second fuel assembly includes an amount of the burnable poison which is less than that in said first fuel assembly,
wherein the majority of fuel rods of said second assembly are loaded around the outer periphery of said core and the majority of fuel rods of said first fuel assembly are loaded at the center of said core, and wherein
said first and second fuel assemblies define a section filled with a fuel material comprising a natural uranium section located at least at the upper or lower end of each of said fuel rods and an enriched uranium section consisting of an upper section, an intermediate section and a lower section, each of which have an average enrichment across a cross section of the fuel assembly, wherein said average enrichment in the cross section of the fuel assembly at the upper and lower sections is less than that at the intermediate section and wherein
said enriched uranium section includes at least two sub-sections in which the respective amounts of said burnable poison per unit length in the axial direction are different such that the amount of said burnable poison per unit length in the axial direction in said upper section is less than the amount of said burnable poison per unit length in the axial direction in said lower section and,
wherein said plurality of fuel rods comprise fuel rods without poison having variations in enrichment between natural uranium sections located at the upper and lower ends of these fuel rods, and fuel rods with poison having the same enrichment between natural uranium sections located at the upper and lower ends of these fuel rods.

8. A core of a nuclear reactor as set forth in claim 7, wherein a plurality of cross-shaped control rods are inserted so that each of said first and second fuel assemblies are arranged such that four fuel assemblies surround said each of said control rods.

9. A fuel assembly as set forth in claim 1, wherein the amount of said burnable poison per unit length in the axial direction in said intermediate section of said enriched uranium section is less than the amount of said burnable poison per unit length in the axial direction in said lower section of said enriched uranium section.

10. A fuel assembly for a nuclear reactor comprising:

a plurality of fuel rods each of which is filled with a fuel material;

a large-diameter water rod which occupies a space substantially equal to that occupied by a plural number of fuel rods, said plurality of fuel rods defining a section filled with a fuel material comprising a natural uranium section located at least at the upper or lower end of each of said fuel rods and an enriched uranium section consisting of an upper section, an intermediate section and a lower section, each of which have an average enrichment across the cross section of the fuel assembly, wherein said average enrichment in the cross section of the fuel assembly at the upper and lower sections is less than that at the intermediate section, wherein said upper and lower sections of said enriched uranium section have a substantially equal average degree of enrichment across a cross section of the fuel assembly, and said enriched uranium section having at least two sections which include a burnable poison, wherein the respective amounts of the burnable poison per unit length in the axial direction are different such that the amount of said burnable poison per unit length in the axial direction in said upper section is less than the amount of said burnable poison per unit length in the axial direction in said lower section, and wherein said plurality of fuel rods comprise fuel rods without poison having variations in enrichment between natural sections located at the upper and lower ends of these fuel rods, and fuel rods with poison having the same enrichment between natural uranium sections located at the upper and lower ends of these fuel rods.

11. A fuel assembly for a nuclear reactor comprising:
a plurality of fuel rods each of which is filled with a fuel material;

a large-diameter water rod which occupies a space substantially equal to that occupied by a plural number of fuel rods, said plurality of fuel rods defining a section filled with a fuel material comprising a natural uranium section located at least at the upper or lower end of each of said fuel rods and an enriched uranium section consisting of an upper section, an intermediate section and a lower section, each of which have an average enrichment across the cross section of the fuel assembly, wherein said average enrichment in the cross section of the fuel assembly at the upper and lower sections is less than that at the intermediate section, and said enriched uranium section having at least two sections which include a burnable poison, wherein the respective amounts of the burnable poison per unit length in the axial direction are different such that the amount of said burnable poison per unit length in the axial direction in said upper section is less than the amount of said burnable poison per unit length in the axial direction in said lower section, wherein the amount of burnable poison per unit length in the axial direction in said intermediate section of said enriched uranium section is substantially equal to the amount of said burnable poison per unit length in the axial direction in said lower section of said enriched uranium section, and wherein said plurality of fuel rods comprise fuel rods without poison having variations in enrichment between natural uranium sections located at the upper and lower ends of these fuel rods, and fuel rods with poison having the same enrichment between natural uranium sections located at the upper and lower ends of these fuel rods.

* * * * *

UNITED STATES PATENT AND TRADEMARK OFFICE
CERTIFICATE OF CORRECTION

PATENT NO. : 5,198,186
DATED : March 30, 1993
INVENTOR(S) : Ogiya et al.

It is certified that error appears in the above-identified patent and that said Letters Patent is hereby corrected as shown below:

On the Title Page, Item [73] assignee should be as follows:

Kabushiki Kaisha Toshiba
    Kawasaki-Shi, Japan

Hitachi, Ltd.
    Tokyo-To, Japan

General Electric Company
    Schenectady, New York

Signed and Sealed this

Twenty-first Day of June, 1994

*Attest:*

BRUCE LEHMAN

*Attesting Officer*      *Commissioner of Patents and Trademarks*